United States Patent [19]
Taylor et al.

[11] Patent Number: 5,201,336
[45] Date of Patent: Apr. 13, 1993

[54] FIRE SAFE VALVE

[75] Inventors: William M. Taylor; Gerald S. Baker, both of Houston, Tex.

[73] Assignee: Cooper Industries, Inc., Houston, Tex.

[21] Appl. No.: 833,150

[22] Filed: Feb. 10, 1992

[51] Int. Cl.$^5$ ............................................. F16K 17/40
[52] U.S. Cl. ...................................... 137/72; 137/457
[58] Field of Search ...................... 137/72, 75, 76, 77, 137/457; 222/54

[56] References Cited

U.S. PATENT DOCUMENTS

| | | | |
|---|---|---|---|
| 2,080,373 | 5/1937 | Marvin | 137/77 X |
| 4,214,600 | 7/1980 | Williams, Jr. et al. | 137/72 |
| 4,245,661 | 1/1981 | McGee | 137/72 |
| 4,540,013 | 9/1985 | Furley et al. | 137/75 |
| 4,570,659 | 2/1986 | Karr, Jr. | 137/72 |

OTHER PUBLICATIONS

"The Heat Pipe: Hot New Way to Save Energy" in Mar. 11, 1976, issue of Machine Design, pp. 52 to 56, by Robert B. Aronson.

*Primary Examiner*—Martin P. Schwadron
*Assistant Examiner*—Kevin L. Lee

[57] ABSTRACT

A fire safe valve which includes a body having an inlet, an outlet, a valve chamber communicating with the inlet and the outlet and having an opening, a bonnet secured to the body and having a bore therethrough with the opening of the bore communicating with the valve chamber opening and defining a back seat surrounding the bore, a valve member, a valve stem connected to the valve member and extending through the bonnet bore, a backseating shoulder on the valve stem, an actuator, the valve stem connecting to the actuator to move the valve member within the valve chamber to open and close flow through, the valve, a temperature sensitive material retaining the valve stem shoulder spaced from said bonnet bore seat during normal operations and allowing additional movement of the valve stem responsive to excessive temperatures to bring the valve stem shoulder into engagement with the bonnet bores seat to backseat and prevent flow of fluids within the valve from escaping therefrom. A heat transmitting jacket is connected between a position close to the heat sensitive means and a position spaced therefrom to ensure the early transmission of heat to the temperature sensitive material when remote portions of the valve are subjected to fire. The jacket includes heat pipes mounted in spaced ring for the transmission of heat.

10 Claims, 7 Drawing Sheets

FIRE SAFE VALVE

BACKGROUND

The present invention relates to an improved valve which when subjected to fire or elevated temperatures which will destroy the stem packing will react to such temperatures prior to the destruction of the stem packing to move to its fail safe position and to back seat to prevent any loss of fluid from the valve chamber when the packing is destroyed.

Prior to the present invention, there have been numerous valves of this type which included a fusible material in supporting relationship to the position of the stem so that when a fire melted the fusible material, it allowed the stem to move to its safe position with the stem shoulder engaging the seat surrounding the outer portion of the stem which is above the shoulder. This back seating prevented fluids within the valve chamber below the seat from flowing past the destroyed packing and feeding the fire. It is also desired that the stem move to its backseated position before the fire causes the building of excessive pressure in the valve chamber.

U.S. Pat. No. 4,214,600 discloses such a valve in which the heat sensitive material is within the cap surrounding the outer end of the stem. It operates to release support for the stem whenever it is subjected to a level of heat at which it melts which allows the stem shoulder to engage the seat surrounding the bonnet opening through which the stem extends. This prevents the passage of fluids within the valve from being discharged through the area in which the stem packing is contained.

U.S. Pat. No. 4,245,661 discloses another similar structure supported by fusible material which when it melts allows the stem to back seat and prevent the discharge of fluids contained within the valve through the stem passage.

U.S. Pat. No. 4,570,659 discloses another valve which utilizes eutectic material to support the valve stem to prevent back seating until the material melts.

U.S. Pat. No. 4,540,013 discloses a fire responsive stem retention apparatus which includes securing the inner cap to the outer sleeve by sweating it thereon with fusible material. This is used to prevent axial movement of the stem and to allow the stem to move and backseat when the fusible material melts and releases the inner cap and allows backseating of the stem.

Thus, U.S. Pat. Nos. 4,214,600; 4,245,661; 4,540,013; and 4,570,659 all disclose valves which include a fusible material to prevent the valve from backseating during normal operations but which melts to allow the valve to back seat when exposed to fire or excessive heat. However, none of these patents has recognized the problem of a fire heating the body of the valve away from the fusible material which can cause the stem packing to fail before the fusible material melts and allows backseating.

It has been discovered that if the fire is directed at the body of the valve and the fusible material is contained within the bonnet, the fusible material may not melt and release its support of the stem before the stem seals or packing are destroyed so that the valve leaks past the stem which renders it useless and dangerous.

Prior to the present invention, the use of heat pipes has been known. Such heat pipes are efficient heat transfer devices which functions to transfer heat to attempt to keep both ends at the same temperature. An article on heat pipes appeared, entitled "The Heat Pipe: Hot New Way to Save Energy" in the Mar. 11, 1976 issue of Machine Design, pages 52 to 56. Heat Pipes are available from Thermacore, Inc. of Lancaster, Pa.

SUMMARY

The present invention relates to an improved fire safe valve which includes a fusible material supporting the stem spaced from its backseating position during normal operations and includes a jacket connected to the valve which includes heat pipes to transfer heat from locations on the valve distant with respect to the fusible material to locations near the fusible material. This structure is in the form of a bolt-on jacket containing heat pipes which can transfer heat from the valve body to the fusible support material allowing the valve to backseat prior to the destruction of the stem seals or packing.

An object of the present invention is to provide an improved valve which when subjected to fire or elevated temperatures ensures that the valve stem will move to its backseated position responsive to the removal of the support provided by fusible material.

Another object is to provide an improved valve which when subjected to fire does not create further fire problems by leaking through the stem seal.

A further object is to provide an improved valve having a fusible material supporting the stem from backseating which will back seat before sufficient damage to the stem seals or packing can occur independently of the portion of the valve which is receiving the direct heat from the fire.

BRIEF DESCRIPTION OF THE DRAWINGS

These and other objects of the invention are hereinafter set forth and explained with reference to the drawings wherein.

DESCRIPTION OF THE PREFERRED EMBODIMENT

Figure 1:
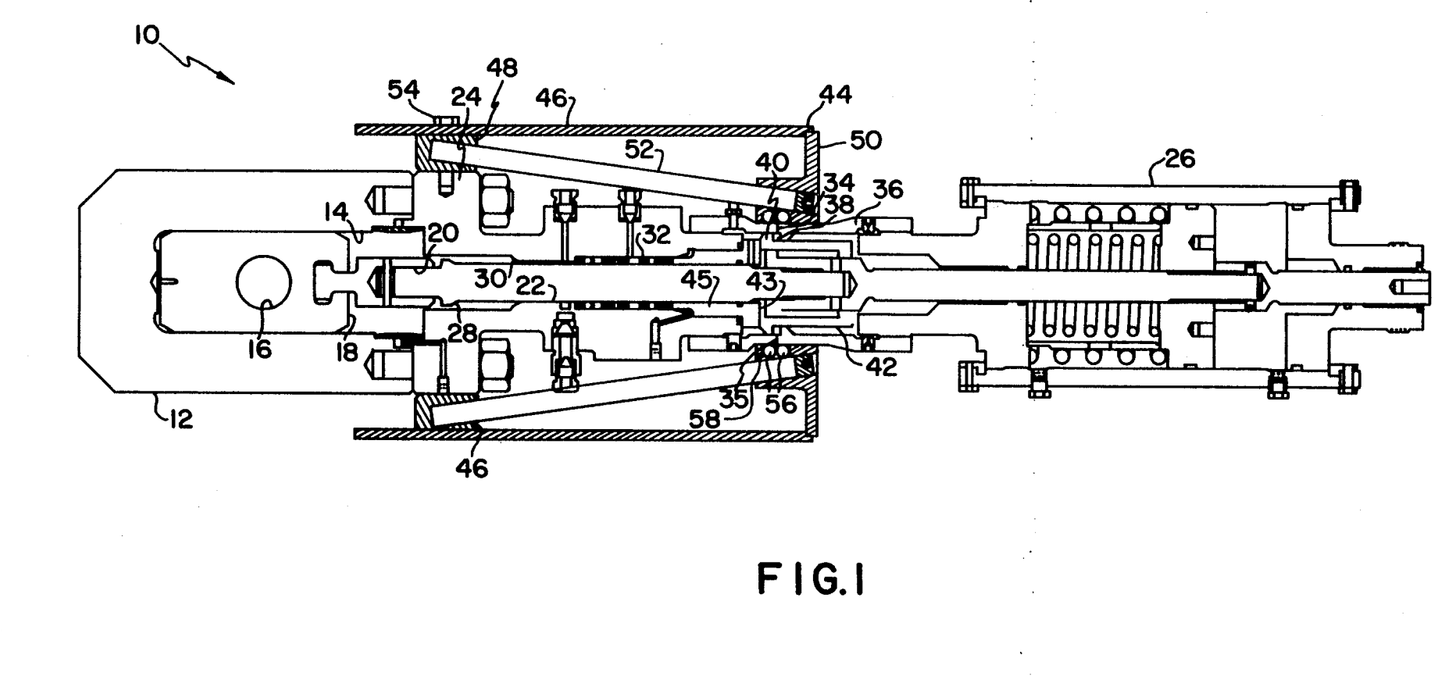
FIG. 1 is a sectional view of the improved valve of the present invention showing the valve stem and gate in their innermost positions with the valve open and the stem not in backseated position.
Figure 2:
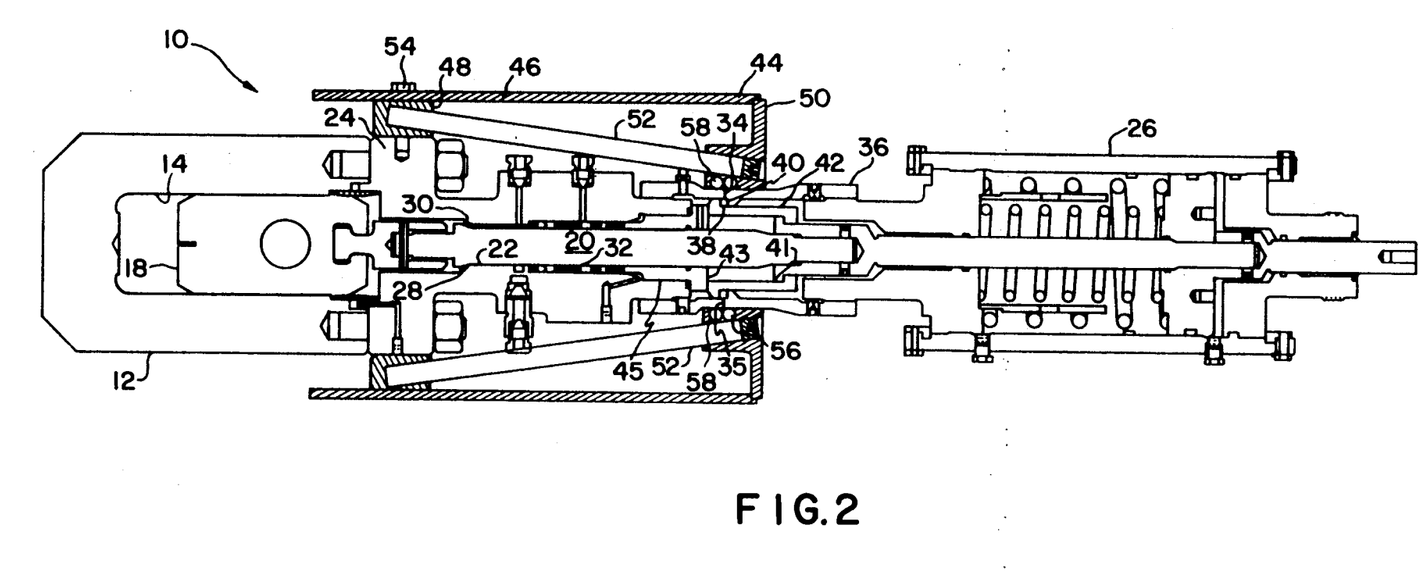
FIG. 2 is a similar sectional view of the valve shown in FIG. 1 but showing the valve stem and gate with the gate closed but with the stem not in backseated position.

Valve 10 is a gate valve including body 12, having openings forming the inlet and outlet for the valve and such openings communicate with valve chamber 14 through valve seat 16. Valve member 18 is movably positioned within valve chamber 14 for opening and closing flow therethrough by its coaction with valve seat 16. Stem 20 extends therefrom through the bore 22 in bonnet 24 to actuator 26. Stem 20 includes stem shoulder 28 on its exterior and stem seat 30 is positioned at the entrance to bore 22. During normal operations as can be seen in FIGS. 1 and 2, stem shoulder 28 remains spaced from stem seat 30 but when there is a fire or extremes of temperature, it is desired that stem shoulder 28 engage steam seat 30 in tight sealing engagement. Stem packing 32 is provided in bore 22 and provides the seal around stem 20 within bore 22.

Figure 3:
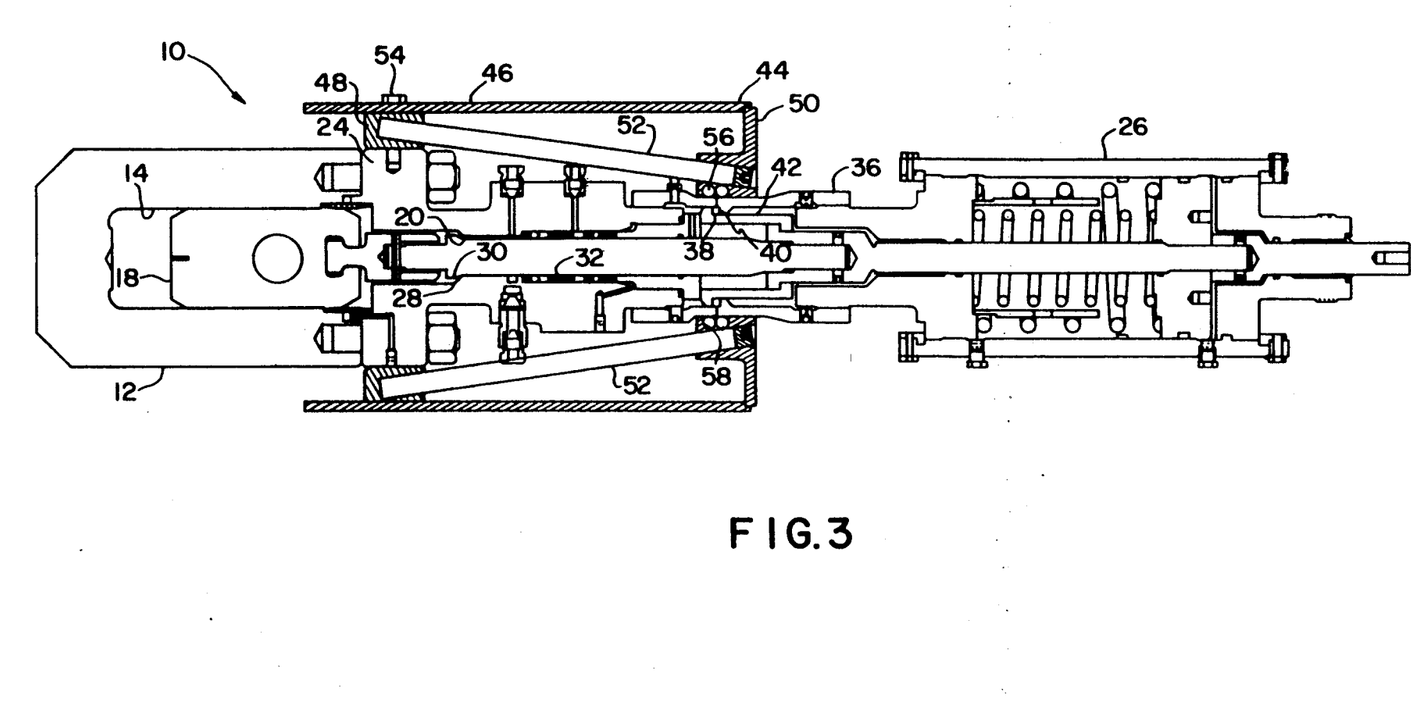
FIG. 3 is a similar sectional view of the valve shown in FIG. 1 but showing the valve stem and gate in their outermost positions with the gate closed and with the valve stem in its backseated position.

Valve 10 is provided with a heat responsive material or fusible material 34 which is positioned within sleeve 36 which connects between bonnet 24 and actuator 26. Material 34 is positioned within sleeve 36 between sleeve shoulder 38 and shoulder 40 on stop ring 42. Stop ring 42 engages shoulder 43 on stem ring 45 to prevent backseating movement while stop ring 42 is supported by material 34. This is clearly shown in FIGS. 1 and 2. As shown in FIG. 3, when material 34 is exposed to heat sufficient heat, it melts and passes out through port 35 in sleeve 36 and allows the additional movement of stem to bring stem shoulder 28 into tight sealing engagement with seat 30, thus backseating the stem 20 so that even if the stem packing 32 is destroyed by the fire, none of the fluids within valve body 12 can flow through bore 22 and escape to feed the fire.

In accordance with the objects of the present invention heat transfer jacket 44, as shown in FIG. 1, includes outer sleeve 46, first ring 48, second ring 50 and heat pipes 52 having their ends secured in rings 48 and 50. Heat transfer jacket 44 is secured to bonnet 24 by suitable securing means, such as cap screws 54, at a position close to body 12 and to sleeve 36 by suitable means (not shown). Semicircular heat pipes 56 are positioned in recess 58 on the interior of second ring 50 to ensure uniform transmission of heat to the exterior of sleeve 36 and fusible material 34. Semicircular heat pipes 56 are shown in more detail in FIG. 9 and have a curvature and size which will place them in tight heat exchange engagement with the interior of recess 58 and with the exterior of sleeve 36.

Figure 4:
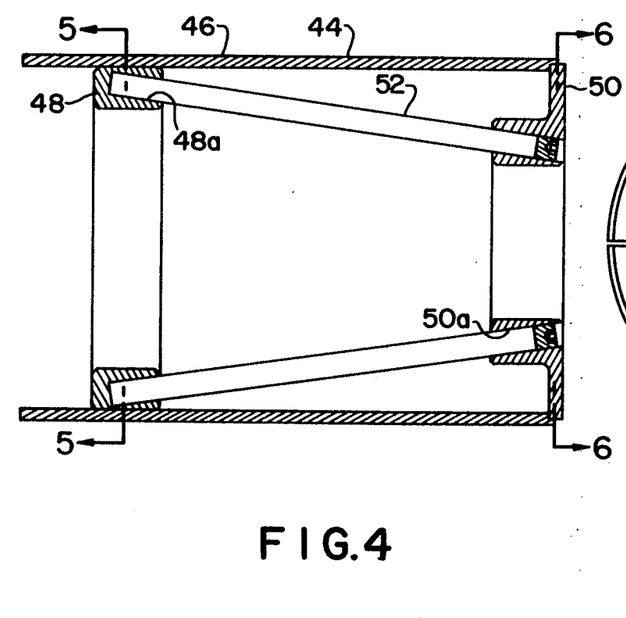
FIG. 4 is a sectional view of the heat transmission jacket shown in FIGS. 1, 2 and 3.
Figure 5:
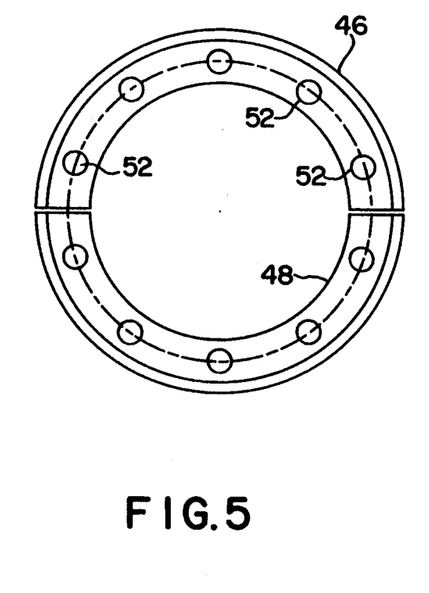
FIG. 5 is a sectional view taken along line 5—5 in FIG. 4 to illustrate the position of one end of the heat pipes.
Figure 6:
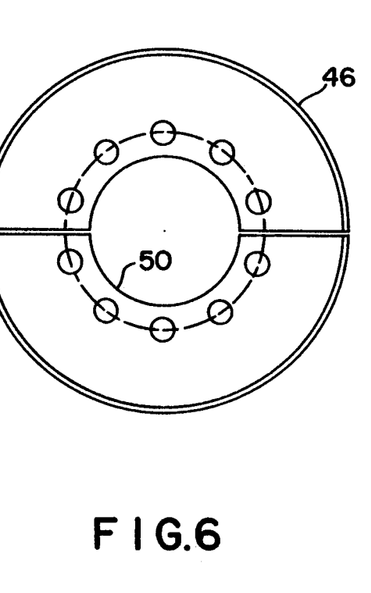
FIG. 6 is a sectional view taken along line 6—6 in FIG. 4 to illustrate the position of the other end of the heat pipes.

The details of heat transmission jacket 44 are shown in FIGS. 4, 5 and 6. Jacket 44 includes inner ring 48, outer ring 50 and shell or sleeve 46 connecting rings 48 and 50. Heat pipes 52 are positioned within openings 48a in inner ring 48 and extend through and thread within openings 50a in outer ring 50 as shown. Heat pipes 52 are preferably soldered into the openings in rings 48 and 50 so that the heat transmission between heat pipes 52 and rings 48 and 50 are improved. It should be noted that sleeve or sheet 46 performs the functions of securing the positions of rings 48 and 50 with heat pipes 52 therein and also to protect heat pipes 52 from damage or the collection of materials thereon which might interfere with the intended heat transmission of heat pipes 52.

Valve 10 operates in the usual manner as illustrated in FIGS. 1, 2 and 3. In FIG. 1 valve 10 is in its opening position (valve member 18 and stem 20 being positioned at their leftmost position as shown in the figure. In FIG. 2 valve 10 has been moved to its closed position which shuts off flow therethrough by valve member 18 preventing flow through body 12. In this closed position, stem 20 and valve member 18 have moved to the right as compared to the position shown in FIG. 1 but stem shoulder 28 is still spaced from seat 30 because stem 20 is prevented from further movement to the right by the engagement of stem sleeve 43 with the inner flange 41 on stop ring 42. As shown, stop ring 42 is prevented from moving to the right by fusible material 34. When conditions are such that fusible material 34 is heated to its melting point, it melts and allows stop ring 42 and stem sleeve 43 to move to the right with respect to the closed position shown in FIG. 2. This allows stem 20 to move to the right, bringing stem shoulder 28 into tight sealing engagement with seat 30 so that fluids within chamber 14 cannot flow therefrom through the annular space between stem 20 and bore 22 after packing 32 has been damaged by the excessive heat. This backseating prevents the fluids in the valve from leaking out of the valve and provides a safer valve under fire conditions.

Figure 7:
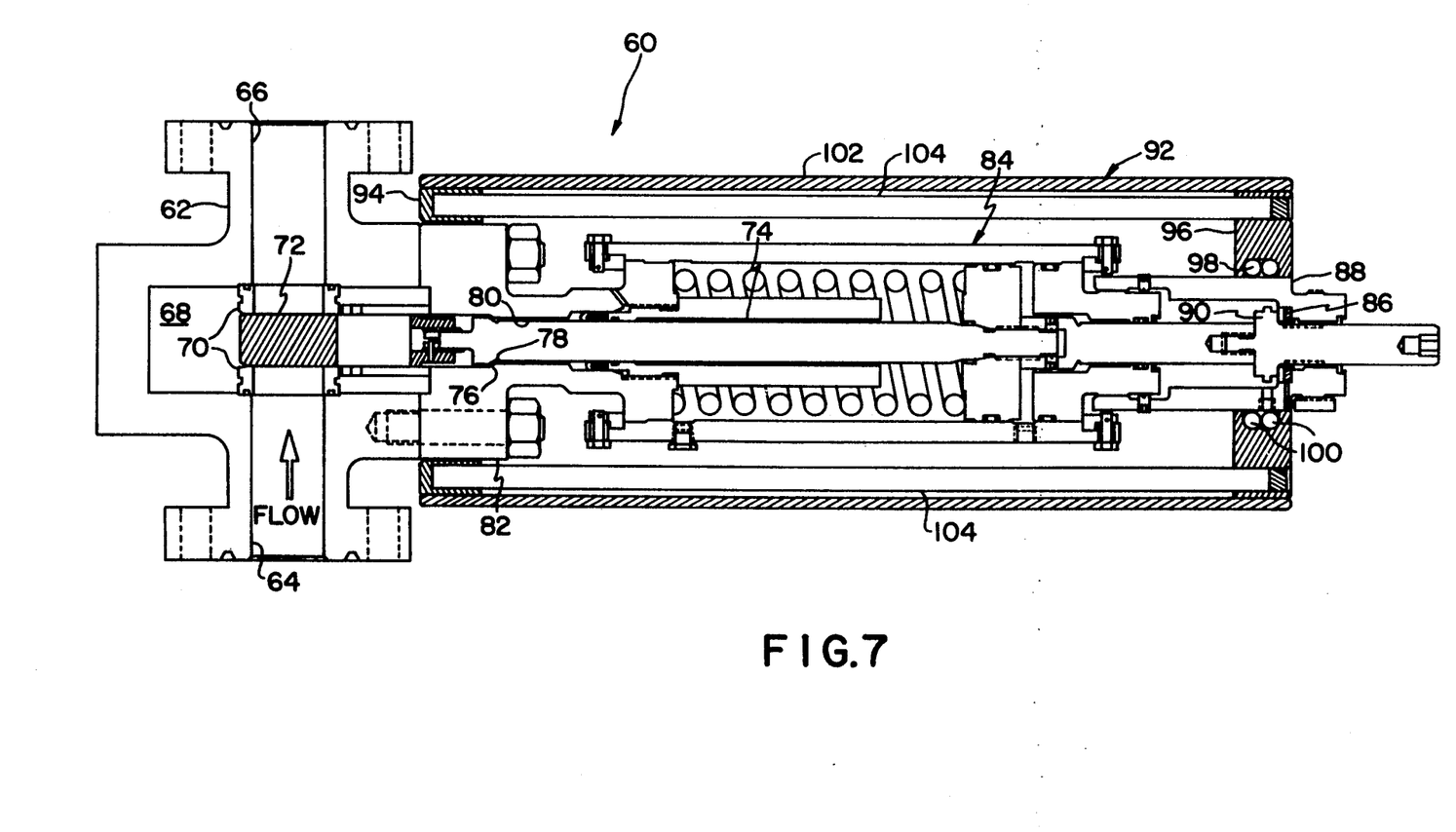
FIG. 7 is a sectional view of a modified form of valve of the present invention having a heat transfer jacket with the pipes running generally parallel to the stem and showing the valve closed but not backseated.
Figure 8:
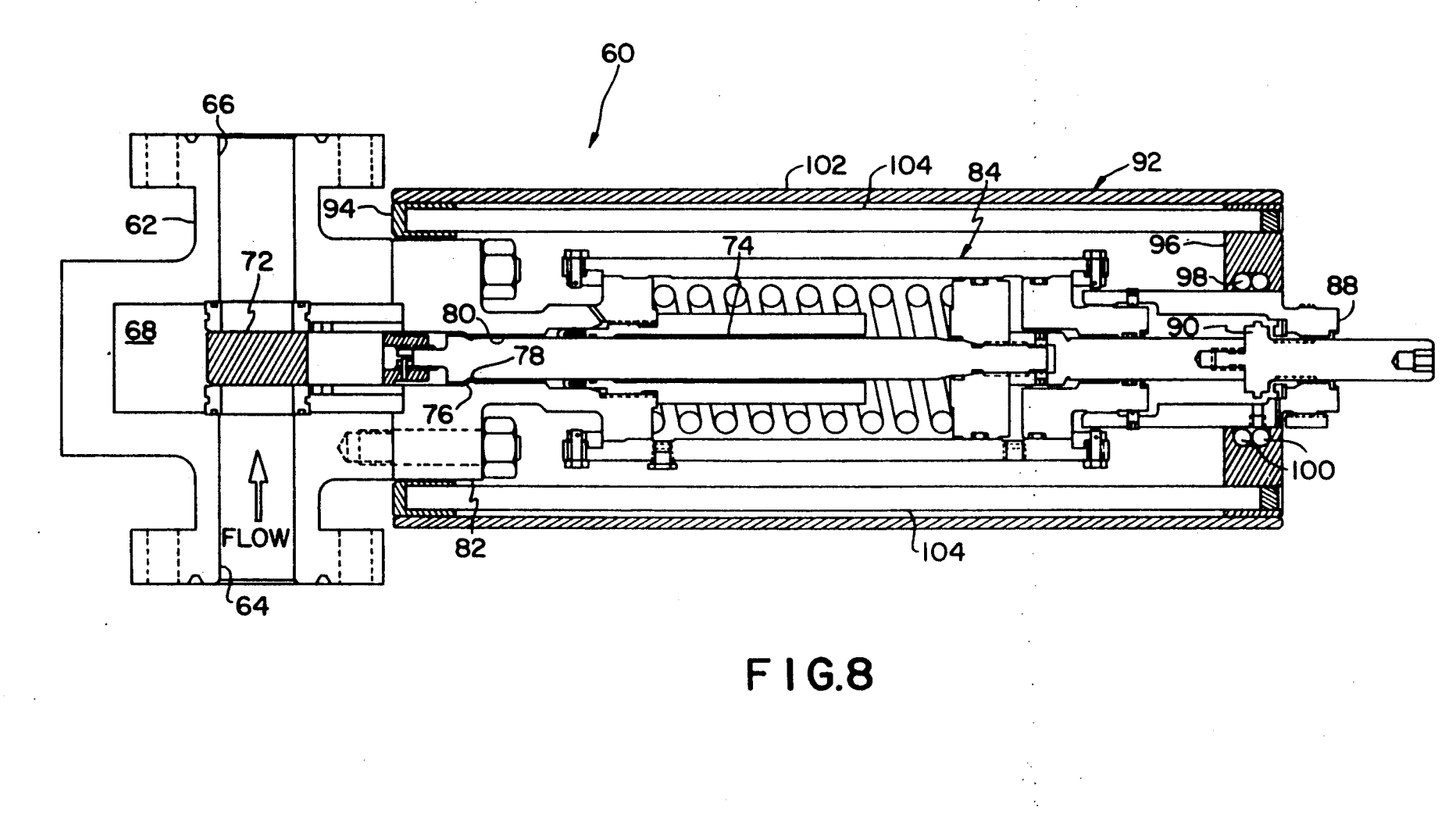
FIG. 8 is a similar sectional view to FIG. 7 but showing the valve closed and backseated.

Valve 60, shown in FIGS. 7 and 8, includes body 62 including openings therein which form inlet 64 and outlet 66 both of which communicate with valve chamber 68. Valve seats 70 are positioned within valve chamber 68 and on opposite sides of valve member 72. Stem 74 extends from valve member 72 and includes outwardly facing shoulder 76 which faces seat 78 surrounding the entrance to bore 80 through bonnet 82. Seat 78 functions as the backseat. Actuator 84 is secured to bonnet 82 and to stem 74 to cause the opening and closing movement of stem 74 and valve member 72. The outer end of stem 74 is supported by heat responsive material 86 which is positioned within sleeve 88 to support stem extension 90. Heat transmission jacket 92 is positioned with its inner ring 94 in tight engagement around the inner portion of bonnet 82 and its outer ring 96 in tight engagement around sleeve 88. Outer ring 96 includes recess 98 on its interior and semicircular heat pipes 100 positioned therein to ensure maximum heat transmission from ring 96 to material 86. Heat jacket 92 also includes sleeve 102 connecting the exterior of rings 94 and 96. Heat jacket 92 is similar to jacket 44 except that because of the valve configuration shown in FIGS. 7 and 8 heat pipes 104, which are secured in rings 94 and 96, are positioned in generally parallel relationship to the axis of stem 74.

Figure 9:
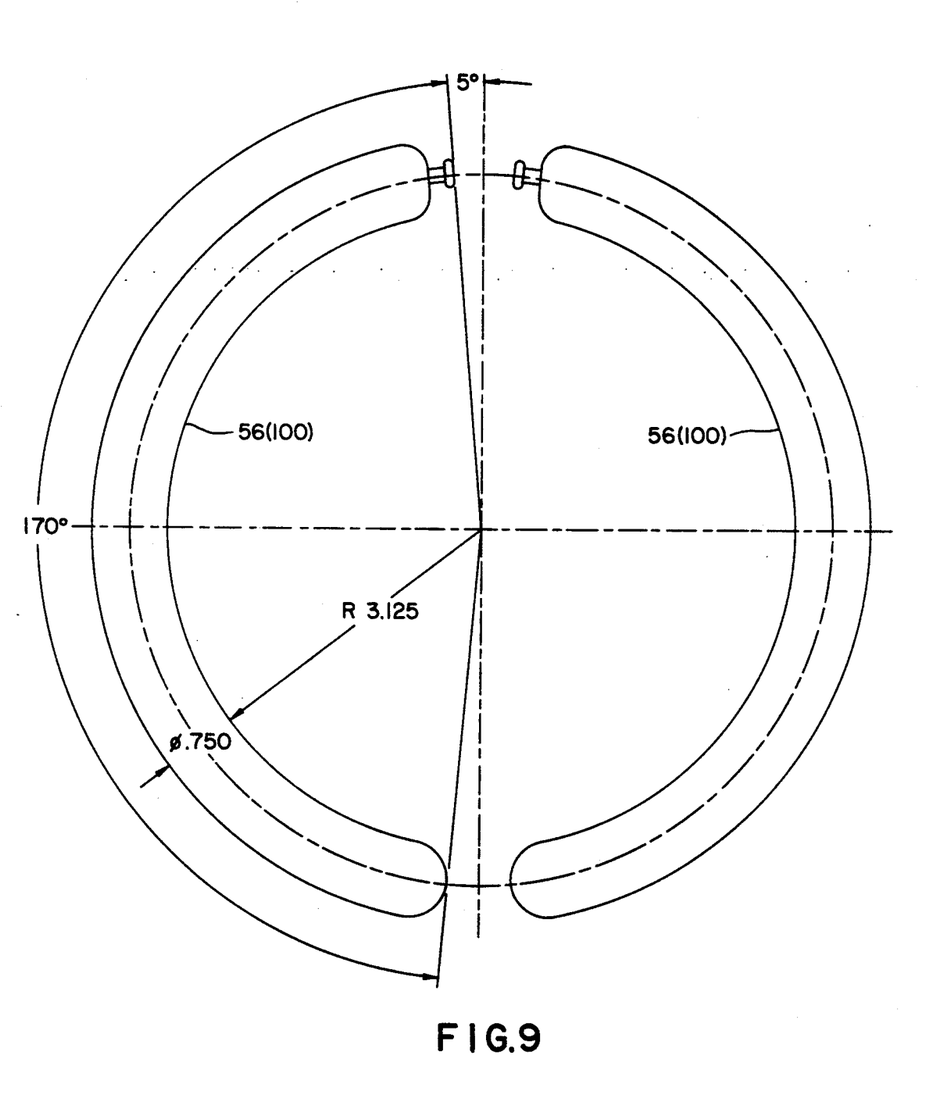
FIG. 9 is a view of the semicircular heat pipes used with the valve to ensure uniform transmission of the heat to the fusible material in an area around its entire circumference.

Semicircular heat pipes 56 and 100 are shown in greater detail in FIG. 9 and are two heat pipes which are bent into a semicircular configuration to be position with their respective recesses as previously described. Heat pipes 56 (100) are slightly smaller than a complete 180° semicircle to allow their entry into their recesses with ease.

All of the heat pipes shown herein are made of any suitable materials which provides greatly improved heat transmission. One heat pipe which is believed to be satisfactory is a water filled copper tube with a suitable copper wick therein. Also, heat transmission is assisted by making both inner and outer rings of copper. In most cases, heat pipes may be secured in position by soldering or with the use of a heat conducting epoxy, such as that sold by Emerson & Cuming Company under the trade name Ecobond. This form of securing will enhance the heat transmission between the rings and the heat pipes as compared to the mounting of the heat pipes without the solder or epoxy.

What we claim is:

1. A valve suitable for use in installations needing protection against fire or excessive heat comprising
    a body having an inlet and outlet and a valve chamber having an opening through said body,
    a valve member movably positioned in the valve chamber to close flow between said inlet and said outlet in one position and to allow flow therebetween in another position,
    a bonnet connected to said body and surrounding the opening of said valve chamber,
    said bonnet having a bore extending therethrough,
    said bonnet defining a seat surrounding the opening to said bore,
    means for moving said valve member,
    a stem connected to said valve member and extending through said bonnet opening to connect to said moving means,
    a shoulder on said stem,
    temperature sensitive means for limiting travel of said stem in one direction so that its shoulder is spaced a preselected distance from said bonnet seat,
    said temperature sensitive means being preselected to release said travel limitation of said stem when it is exposed to a preselected amount of heat so that the stem shoulder will backseat on said bonnet seat, and
    means for rapidly transmitting heat from a portion of said valve spaced from said temperature sensitive means to a position near said temperature sensitive means to ensure that excessive heat to which the valve is exposed to directed to said temperature sensitive means,
    said heat transmitting means includes heat pipes mounted on one of said valve and said bonnet adjacent to said body to transmit heat to a position surrounding said temperature sensitive means.

2. A valve according to claim 1 wherein said heat transmitting means includes
    heat pipes mounted on said valve to transmit heat to a position near said temperature sensitive means from a position on the valve spaced significantly therefrom.

3. A valve according to claim 2 including
    a jacket supporting said heat pipes, and
    means for connecting said jacket to said valve at a point closer to the body than said temperatures sensitive means.

4. A valve according to claim 3 including
    a first ring secured to said bonnet adjacent said body,
    a second ring secured to said bonnet adjacent said temperature sensitive means,
    said heat pipes securing within openings in said rings and extending therebetween to transmit heat from the first ring to the second ring.

5. A valve according to claim 4 including
    said heat pipes being soldered into openings in said rings.

6. A valve according to claim 4 including
    said second ring having an internal recess,
    heat pipes positioned within said internal recess in said second ring to improve the heat transmission from the second ring to the temperature sensitive means.

7. A valve according to claim 4 including
    said heat pipes being secured within openings in said rings by a heat transmitting epoxy.

8. A valve according to claim 4 wherein
    said heat pipes include a copper tube, a copper wick and water within the copper tube.

9. A valve according to claim 8 wherein
    said first and second rings are copper.

10. A valve according to claim 4 including
    an outer sleeve secured to the exterior of said first and second rings.

* * * * *